United States Patent Office 2,753,764
Patented July 10, 1956

2,753,764

PROFILE COPYING MACHINES

Robert Alfred Stephenson, Blaby, England, assignor to Power Jets (Research and Development) Limited, London, England, a British company Application November 19, 1951, Serial No. 257,076

Claims priority, application Great Britain November 23, 1950

8 Claims. (Cl. 90—13)

This invention relates to profile copying machines of the kind having a stylus adapted for movement relatively to a model and a follower adapted for corresponding movement relatively to a workpiece, the follower being, in the case of a profile forming machine, a rotary cutting tool for shaping the workpiece or, in the case of a profile checking machine, merely a tracer for generating a profile with which the profile of the workpiece, already at least approximately shaped, may be compared.

One aspect of the invention is concerned with the profile forming type of machine, and has for an object the production of a model so shaped as to promote the production of a workpiece of the desired form to within acceptable limits of accuracy. Although the invention will be described for simplicity as used on a machine as illustrated with tracer and tool mechanically linked the invention is clearly of general application and in particular to a machine with the tool hydraulically actuated under control of the tracer. Although, in general, such models may be and commonly are shaped by hand or otherwise with accuracy to a predetermined form, there frequently arises the necessity, when the model so shaped is arranged on the machine for which it is intended, for further shaping of the model by way of correction for inaccuracies in the machine itself in order that the form produced in the workpiece shall conform sufficiently closely with what is intended. The present invention is concerned, in this aspect with the provision of means giving an indication when and where such further shaping of the model is required.

The invention accordingly proposes a method of finally shaping a model for use in a profile forming machine of the kind described comprising the steps of arranging the pre-formed model in its operative position on the machine adjacent the stylus, of arranging, also in appropriate operative position, a dummy workpiece previously former within acceptable limits of accuracy to the desired form, of providing in substitution for the cutter to be used, a tracer which simulates the solid of revolution of the said cutter, of scanning the model with the stylus and detecting discrepancies between the profile traced by the tracer and the profile of the dummy workpiece, and of appropriately modifying the shape of the model to reduce such discrepancies to within acceptable limits. Preferably the dummy workpiece is previously formed by shaping a workpiece on the machine in conformity with the pre-formed model and then finishing it by hand to the desired degree of accuracy.

Thus a sequence of operations for preparing the machine for the production of profiled bodies may involve shaping the model approximately to its predetermined form, installing same in the machine, cutting a workpiece to correspond with the model, accurately finishing the workpiece by hand and replacing it in the machine, replacing the cutter by a tracer, scanning the model with the stylus and detecting discrepancies in the corresponding movement of the tracer over the workpiece, and finally shaping the model to reduce them.

It is further proposed according to the invention, for the purposes of detecting discrepancies between the profile traced by the tracer and the true profile of the dummy workpiece, that the tracer comprises a member, externally shaped to conform with the solid of revolution of the cutter to be used, which is rotatably mounted without special precautions to ensure absolute concentricity on the rotatable cutter arbor of the machine, and that this tracer member and the dummy workpiece be electrically connected to an indicator in such a way that the existence or otherwise of electrical contact between the tracer member and workpiece is indicated. It will be appreciated that, in the absence of any special precautions to ensure its concentricity, the mounting of the tracer member will in fact be eccentric to a very slight extent due either to eccentric rotation of the cutter arbor or to eccentricity in the mounting of the tracer element itself on that cutter arbor. Consequently, when for the purposes of the method described in the foregoing the stylus is moved over the pre-formed model, the cutter arbor is rotated at a substantially uniform speed and, because of its eccentric mounting, the tracer member is constrained alternately towards and away from the dummy workpiece. With the latter in suitable juxtaposition to the former, the result, if the model is correctly shaped, is that the indicator circuit is completed and broken with each revolution of the cutter arbor; if on the other hand the model is incorrect the indicator circuit is either complete or broken for one or more complete revolutions of the cutter arbor. It will be appreciated, of course, that the eccentricity of the tracer mounting will be of a small order compared with the permissible tolerance of the workpieces ultimately produced.

It is further proposed, according to the invention that the stylus in use during the detection of discrepancies in the model has a cutting or abrasive surface at its region of contact with the model and that the stylus, being shaped to correspond at least partly, and preferably wholly, with the solid of revolution of the tool, is also correspondingly rotatably mounted. Thus, when the indicator circuit is broken, indicating a high point on the model, the stylus is rotated on this point whereby the surface of the model is cut away until the indicator circuit is completed. When a number of high points on the model have been similarly treated the precise degree of correction necessary on the intermediate surface may be readily assessed and effected by hand.

Another aspect of the invention is concerned with the profile checking type of machine and contemplates the broad application to such a machine of the principle, already exemplified in its relation to the previous aspect of the invention, of detecting discrepancies between the profile traced by a tracer under the control of a copying mechanism, and the profile of the surface over which the tracer passes.

The invention accordingly proposes in this connection a machine for detecting discrepancies between the shape of a model and the shape of a workpiece comprising means for holding respectively the model and the workpiece, a stylus adapted for movement over the profile of one of these and a tracer adapted to move substantially correspondingly over the profile of the other, means for superimposing upon the movement of the tracer a periodic vibratory movement alternately toward and away from the surface of the profile over which it moves and of a small amplitude compared with the discrepancies to be detected whereby, in the absence of such discrepancies the tracer will make periodic intermittent contact with the said surface, and means for detecting prolonged noninterruption or interruption of contact between the tracer and surface.

The foregoing and additional features of the invention will now be described as applied to a typical copy-milling machine with reference to the accompanying drawings in which.

Figure 1:
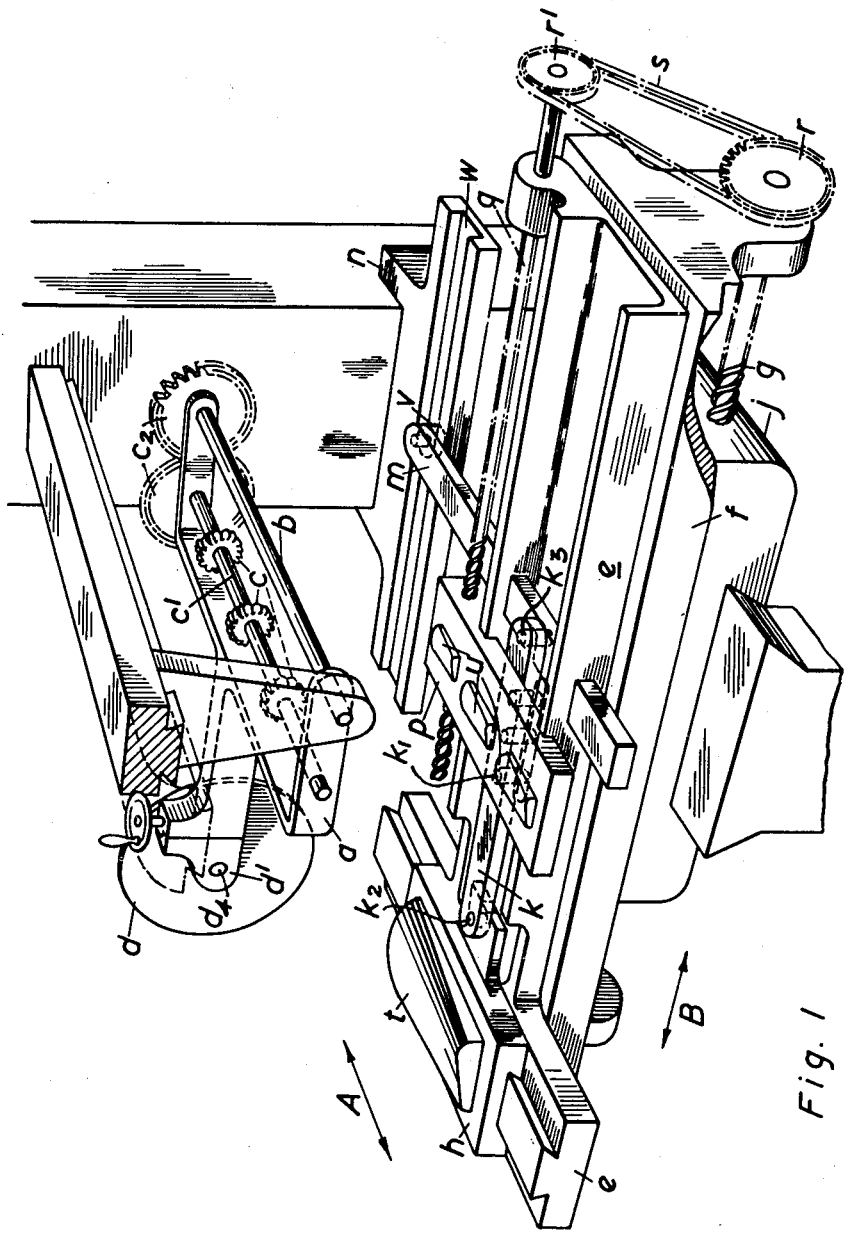
Figure 1 represents an isometric projection of the copy-milling machine as set up for normal milling operations.

The normal function of the machine shown in Figure 1 is to reproduce in a workpiece a profile corresponding to that of a model. As shown and described the workpiece is of reduced scale as compared with the model so that any errors in the model tend to be proportionately reduced in the workpiece. The machine comprises a profile detecting arm $a$ which is pivoted on a shaft $b$ and carries, on a horizontal shaft $c^1$, the cutters $c$ which are driven from shaft $b$ through a gear train $c^2$ to the cutter shaft. Suitably disposed along the arm is a further horizontal shaft carrying a freely rotatable detector wheel $d$. Beneath the arm $a$ is a lower main slide $j$ by means of which the basic feed movement, in the direction of arrow A, is applied, whilst an upper main slide $f$, mounted thereon, is movable by means of the threaded shaft $g$ for the application of the basic traverse movement in the direction of arrow B. The basic feed and traverse movements are both applied in the usual manner by lead screws associated with the respective slides, only one of which, the main traverse screw $g$ is shown. The unit comprising upper and lower main slides may be raised or lowered with respect to the arm $a$ by a suitable mechanism (not shown). A subsidiary slide bed $e$ is mounted on the upper main slide $f$ and fixed thereto, having longitudinal ways disposed beneath the detector wheel $d$ and the cutters $c$ in directions of feed and traverse respectively; these ways carry the subsidiary model slide $h$ and the subsidiary workpiece slide $p$ respectively.

The subsidiary model slide $h$ is controlled in the direction of feed by means of a lever $k$ which is pivoted about a vertical pivot $k^1$ on the subsidiary slide bed $e$ for rotation in the horizontal plane; pins $k^2$ and $k^3$ mounted on each end of the lever $k$ engage respectively with slots extending longitudinally in the direction of traverse in the subsidiary model slide $h$ and a control bar $m$, which is mounted on the bed $e$ for movement relative thereto in the direction of feed. One end of the control bar $m$ is provided with a pin $v$ which engages with a channel $w$ in a part $n$ of the machine which may be raised or lowered with the main slides but which is fixed in the directions of feed and traverse; the control bar $m$ is thus longitudinally fixed whilst being free to traverse. The effect of this lever mechanism is to modify, in the movement of the subsidiary model slide $h$ the basic feed movement of the main slides, the degree of modification being dependent on the position of the pivot in the lever $k$. In this case it is disposed nearer to the control bar $m$ so as to magnify the basic feed, but is made adjustable by provision of several corresponding holes in the lever and subsidiary slide bed.

The subsidiary workpiece slide $p$ is controlled in the direction of traverse by the threaded shaft $q$ which is driven through the sprocket wheels $r$ and $r^1$ and the chain $s$ or by other suitable means from the main traverse shaft $g$, thereby receiving a modified proportion of the basic traverse movement of the main slides; the degree of modification is dependent on the ratio of the drive between the shafts $g$ and $q$ and on the pitches of their respective threads. In this case the drive is arranged to diminish the basic traverse, being adjustable by replacement of the sprocket wheels.

The combined effect of the magnified feed of the subsidiary model table and the diminished traverse of the subsidiary workpiece table is to compensate for the reduction in scale between the model $t$ and the workpiece or workpieces $u$, and the respective mechanisms are suitably adjusted in the manner described for that purpose.

The machine shown in Figure 1 may also be modified to provide for adjustment, appropriate to the reduction ratio between model and workpiece, of the profile detecting arm by mounting the cutter shaft for adjustment along the arm to vary its distance from the pivot shaft and detector wheel centres, the cutter shaft driving gears being also adjustable to accommodate such variation. Alternatively a different arm may be substituted for each such adjustment. Under these circumstances the ratio of the diameters of the cutters and the detector wheel must, of course, be appropriately arranged.

In the normal operation of the machine of the kind described with respect to Figure 1, the model and workpiece are first raised with the main slides by the means referred to until the workpieces are in a position with respect to the cutters for the initial series of cuts to be taken. Then the detector wheel $d$ is moved toward and brought to bear on the model $t$ by means of the vertical slide $d^1$. With each successive series of cuts the slide is returned toward its datum position, that is with the pivot shaft $b$, the cutter shaft and the detector wheel shaft all in one plane, whilst the detector wheel is maintained in contact with the model. The final series of cuts is taken with the slide $d^1$ in the datum position.

The work piece slide may be used to accommodate simultaneously as many workpieces as may be convenient, provided that a corresponding number of cutters are provided on the cutter shaft.

The difficulty exists in the machine just described (and a similar difficulty frequently exists in copy-milling machines) that due to backlash in the operating mechanism of the subsidiary model and workpiece slides the actual shape imparted to the workpiece does not wholly correspond with that of the model, so that even if the model is made to conform very closely with a predetermined shape the workpiece produced will not accurately correspond to that shape.

This difficulty is overcome according to the present invention by preparing the machine for operation in the following manner. The model $t$ is first formed only approximately to the predetermined shape and is mounted on the model slide $h$. An unformed dummy workpiece of electrically conductive material is also mounted on the workpiece slide $p$ and the machine is then operated in the normal manner to shape the dummy workpiece. The latter is then further shaped by hand in the usual manner to the precise shape ultimately required in the workpieces proper. Such hand shaping may involve removal of the dummy workpiece from the machine in which case it is subsequently remounted in the same position. Meanwhile, the cutter $c$ which machined the dummy workpiece is removed from the cutter shaft $c^1$ and replaced by a tracer assembly.

Figure 2:
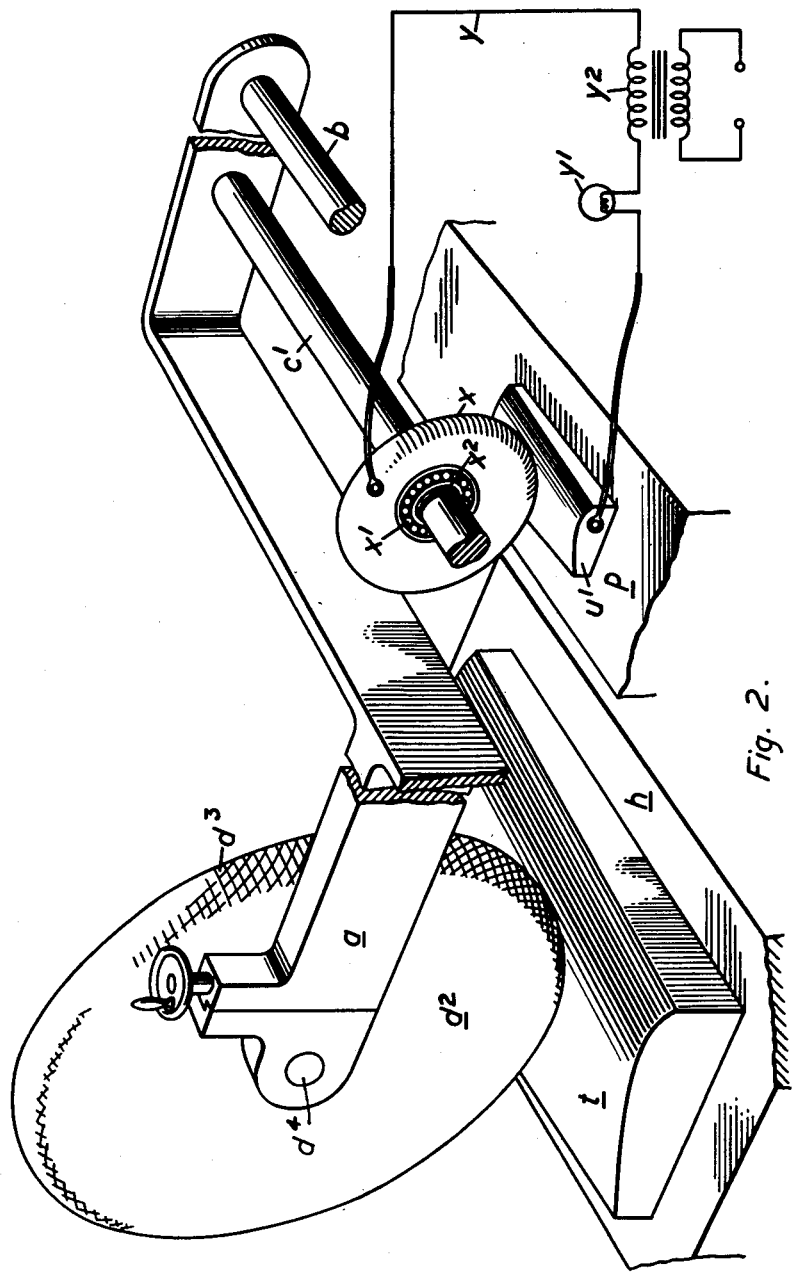
Figure 2 represents an isometric projection of part of the machine of Figure 1 as set up for operation in accordance with the invention.

This adaptation is shown in Figure 2. The tracer assembly comprises an electrically conductive tracer $x$ shaped to conform with the solid of revolution of the cutting edges of the cutter $c$ which it replaces which is mounted through a ball bearing $x^1$ and an insulating bush $x^2$ on the cutter shaft $c^1$ without adopting special measures to ensure concentricity. The tracer $x$ and dummy workpiece $u^1$ are connected by the circuit $y$ (shown diagrammatically) to a lamp $y^1$ and a low voltage alternating current supply afforded by the transformer $y^2$, the circuit being completed by contact between the tracer and dummy workpiece.

The machine is now ready for detecting what changes must be effected in the profile of the pre-formed model $t$ to enable the accurate reproduction in any workpiece of the finished shape of the dummy workpiece $u^1$. To this end, the cutter shaft $c^1$ is run at a low rotational speed while the basic feed and traverse movements are manually controlled so that the detector wheel or stylus $d^2$ passes over the model surface. If the model $t$ is correctly shaped over any given path of the detector wheel $d^2$, the lamp $y^1$ will flash on and off at each revolution of the cutter shaft $c^1$ because there is bound to be some slight eccentricity in the tracer mounting which will cause the tracer $x$ alternately to make and break contact with the dummy workpiece $u^1$. If at any position of the detector wheel on the model the lamp $y^1$ goes off altogether it will indicate that the model is too prominent at that point as it has lifted the tracer off the correctly formed dummy workpiece and, conversely, if the lamp remains on it will show that the model, at that point, is low. This latter eventuality should not arise due to the precaution of making the model initially slightly oversize. If it does arise, however, the model may be raised from the model table $h$ by inserting packing sufficiently to eliminate all such low points, or a similarly appropriate adjustment may be made. Having ensured that all errors on the model are low points, these may be detected, marked and progressively reduced by hand dressing or by a portable grinder for example, with, if necessary, further checking by the indicating system.

In the case described, however, during the model correcting operation, the machine is provided with a special detecting wheel $d^2$ which, while generally similar in shape and overall dimensions to the detecting wheel $d$ used in the normal copy-milling operation and being similarly freely rotatable, has a cutting surface $d^3$ around its periphery where it contacts the model so that it constitutes a rotary file. Accordingly, when the intermittent flashing lamp $y^1$ ceases, indicating a high point on the model $t$, the detecting wheel $d^2$ is rotated by hand in contact with the model so removing material therefrom until the lamp relights. In this way the entire surface of the model to be copied is corrected or, if the amount of correction involved is considerable, a series of correct points are established and marked and the intermediate surface is then reduced by hand and, if necessary, rechecked.

When the form of the model $t$ is completely corrected, the special detecting wheel or stylus $d^2$, the tracer assembly $x$, $x^1$, $x^2$ and the dummy workpiece $u^1$ are removed and replaced respectively by the normal detecting wheel $d$, the cutter $c$ and the actual workpiece $u$, ready for normal operation of the machine.

It will be apparent that the steps described in the foregoing, by temporarily inverting the normal detecting and copying processes of the machine, ensure that errors attributable to the machine affecting the faithfulness of these processes are reflected in the corrected shape of the model and are correspondingly nullified during subsequent normal operation.

The special detecting wheel $d^2$ is produced by forming a blank slightly undersize on its diameter, raising the cutting or filling projections in the usual manner to arrive at the correct diameter and hardening them again in the usual manner. Alternatively a suitably shaped abrasive wheel could be used.

Although the invention has been described in its application to eliminate the effects of backlash in a rigid copying mechanism, it is equally applicable in connection for example, with copy-milling machines having a stylus which is mounted so as to be slightly flexible, this being a feature commonly adopted to enable a moving contact between the stylus and a model to proceed entirely automatically. Here the difficulty sometimes arises that the degree of deflection in the stylus varies at various points on the model profile, unless following a straight line, leading to differences between the shapes of the model and workpiece produced. By applying the present invention these differences may be accommodated in the shape of the model.

While the foregoing description with reference to Figures 1 and 2 has been directed more particularly to the first mentioned aspect of the invention, it will be appreciated that the machine as shown in Figure 2 having the tracer assembly $x$, $x^1$ and $x^2$ constitutes a profile checking machine in accordance with the second mentioned aspect of the invention, it being possible to detect discrepancies in a series of models substituted successively for the model $t$ or, conversely, in a series of workpieces substituted successively for the dummy workpiece $u^1$. In a true checking machine it would be possible, owing to the absence of cutting and similarly high operating loads to reduce backlash in the copying mechanism to a generally less significant degree and the master profile against which others are checked could accordingly be a substantially true profile.

I claim:

1. A machine for indicating discrepancies between the shape of a model and the shape of a workpiece, comprising means for holding respectively the model and the workpiece, a stylus adapted for movement over the profile of one of these and a tracer adapted for movement over the profile of the other, means for supporting and connecting said stylus and tracer to relate their said movements in substantial correspondence, means for superimposing upon the movement of the tracer a periodic vibratory movement alternately toward and away from the surface of the profile over which it moves and of a small amplitude compared with the discrepancies to be detected whereby, in the absence of such discrepanies, the tracer will make periodic intermittent contact with the said surface, and means for indicating contact between the tracer and surface.

2. A machine according to claim 1, wherein said means for indicating contact between said tracer and associated surface comprises an electric current indicator and source of electric supply connected in circuit with the tracer which is electrically conductive, the circuit being adapted to be closed by contact between the electrically conductive tracer and associated surface, the latter being similarly electrically conductive, whereby an indication of such contact is afforded by said indicator.

3. A tracing device having a tracer adapted to bear against a pattern, means for vibrating the tracer comprising a shaft on which the tracer is eccentrically and rotatably mounted, and means for rotating said shaft.

4. The method of preparing a pattern for use in a profile copying machine of the type in which the work cutter is guided over the workpiece by a pattern following device which will introduce error in transmitting the followed profile to the workpiece that comprises placing a correctly shaped workpiece in the workpiece position on the machine, placing a pattern in the pattern position on the machine, comparing the contours of the workpiece and the pattern through the machine, and removing enough material from the pattern to cause the following device to follow a distorted path over the pattern which when transmitted will cause the cutter to follow the contours of a correctly shaped workpiece.

5. The method of preparing a pattern for use in a profile copying machine of the type in which the work cutter is guided over the workpiece by a pattern following device which will introduce error in transmitting the followed profile to the workpiece that comprises placing a correctly shaped workpiece in the workpiece position on the machine, placing a pattern in the pattern position on the machine, following the contours of the workpiece, transmitting them through the machine to a cutting device in the position of the following device for the pattern and removing material from the pattern to permit the following device to follow a distorted path which when transmitted through the machine will cause the cutter to follow a path consistent with the contours of a correctly shaped workpiece.

6. The method of preparing a pattern for use in a profile copying machine of the type in which the work cutter is guided over the workpiece by a pattern following device which will introduce error in transmitting the followed profile to the workpiece that comprises placing a correctly shaped workpiece in the workpiece position on the machine, placing a pattern in the pattern position on the machine, comparing the contours of the workpiece and the pattern through the machine, indicating the discrepancies, marking the areas of discrepancy on the pattern and removing enough material from the pattern to cause the following device to follow a distorted path over the pattern which when transmitted will cause the cutter to follow the contours of a correctly shaped workpiece.

7. A machine for indicating discrepancies between the shape of a model and the shape of a workpiece comprising means for holding respectively the model and the workpiece, a stylus adapted for movement over the profile of one of these and a tracer adapted for movement over the profile of the other, said stylus and tracer being each at least part of a body of revolution, means for supporting and connecting said stylus and tracer to relate their said movements in substantial correspondence, means for superimposing on the movement of the tracer a periodic vibratory movement alternately towards and away from the surface of the profile over which it moves and of a small amplitude compared with the discrepancies to be detected whereby, in the absence of such discrepancies, the tracer will make periodic intermittent contact with the said surface, and means for indicating contact between the tracer and surface, wherein said means for superimposing a periodic vibratory movement on said tracer includes a rotatable tracer shaft, a journal mounted for eccentric rotation with said shaft, said tracer being mounted for free rotation on said journal, and wherein said means for detecting said tracer and associated surfaces comprises an electric current indicator and source of electric supply connected in circuit with the tracer which is electrically conductive, the circuit being adapted to be closed by contact between the electrically conductive tracer and associated surface, the latter being similarly electrically conductive, whereby an indication of such contact is afforded by said indicator.

8. A machine for indicating discrepancies between the shape of a model and the shape of a workpiece comprising means for holding respectively the model and the workpiece, a stylus adapted for movement over the profile of one of these and a tracer adapted for movement over the profile of the other, said tracer being at least part of a body of revolution, means for supporting and connecting said stylus and tracer to relate their said movements in substantial correspondence, means for superimposing on the movement of the tracer a periodic vibratory movement alternately towards and away from the surface of the profile over which it moves and of a small amplitude compared with the discrepancies to be detected whereby, in the absence of such discrepancies, the tracer will make periodic intermittent contact with the said surface, and means for indicating contact between the tracer and surface, wherein said means for superimposing a periodic vibratory movement on said tracer includes a rotatable tracer shaft, and a journal mounted for eccentric rotation with said shaft, said tracer being mounted for free rotation on said journal.

References Cited in the file of this patent

UNITED STATES PATENTS

| | | |
|---|---|---|
| 740,079 | Bauman | Sept. 29, 1903 |
| 766,456 | Meyers | Aug. 2, 1904 |
| 1,037,460 | Ettl | Sept. 3, 1912 |
| 1,313,543 | Keller | Aug. 19, 1919 |
| 1,404,545 | Richardson | Jan. 24, 1922 |
| 1,503,017 | Basky | July 24, 1924 |
| 1,553,814 | Hansen | Sept. 15, 1925 |
| 2,199,103 | Jeffreys | Apr. 30, 1940 |
| 2,225,409 | Bromley | Dec. 17, 1940 |
| 2,316,405 | Clausen | Apr. 13, 1943 |
| 2,366,200 | Langhorst | Jan. 2, 1945 |
| 2,412,619 | Kindermann et al. | Dec. 17, 1946 |
| 2,539,027 | Marchant | Jan. 23, 1951 |
| 2,576,590 | Gentzhorn | Nov. 27, 1951 |
| 2,622,871 | Martin | Dec. 23, 1952 |
| 2,632,956 | Crosby | Mar. 31, 1953 |